US010132226B2

(12) United States Patent
Vyelyayev et al.

(10) Patent No.: US 10,132,226 B2
(45) Date of Patent: Nov. 20, 2018

(54) EXHAUST GAS TREATMENT DEVICE WITH REPLACEABLE INSERT

(71) Applicant: Eberspächer Exhaust Technology GmbH & Co. KG, Neunkirchen (DE)

(72) Inventors: Oleksandr Vyelyayev, Stuttgart (DE); Simon Ehrler, Denkendorf (DE); Markus Henzler, Grafenberg (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 217 days.

(21) Appl. No.: 15/071,549

(22) Filed: Mar. 16, 2016

(65) Prior Publication Data

US 2016/0348566 A1 Dec. 1, 2016

(30) Foreign Application Priority Data

May 27, 2015 (DE) .......................... 10 2015 209 681

(51) Int. Cl.
| | | |
|---|---|---|
| F01N 13/18 | (2010.01) | |
| F01N 3/021 | (2006.01) | |
| F01N 3/28 | (2006.01) | |

(52) U.S. Cl.
CPC ........ *F01N 13/1888* (2013.01); *F01N 3/0211* (2013.01); *F01N 3/2839* (2013.01); *F01N 3/2875* (2013.01); *F01N 3/2878* (2013.01); *F01N 3/2853* (2013.01); *Y02T 10/20* (2013.01)

(58) Field of Classification Search
CPC .. F01N 13/1888; F01N 3/0211; F01N 3/2839; F01N 3/2875; F01N 3/2878; F01N 3/2853; Y02T 10/20
See application file for complete search history.

(56) References Cited

U.S. PATENT DOCUMENTS

2015/0107458 A1* 4/2015 Werni ................. F01N 13/1888
96/380

FOREIGN PATENT DOCUMENTS

WO WO 2013167556 A1 * 11/2013 ......... F01N 13/1888

* cited by examiner

*Primary Examiner* — Brandon Lee
(74) *Attorney, Agent, or Firm* — McGlew and Tuttle, P.C.

(57) ABSTRACT

An exhaust gas treatment device (1), for an exhaust system of an internal combustion engine, includes a tubular housing (2) and an insert (5) arranged replaceably in the housing (2). The insert (5) has an exhaust gas treatment element (7) fixed in a tubular jacket (6) and is able to be pushed into the housing (2) in a pushing-in direction (9), which extends parallel to a central longitudinal axis (10) of the housing (2). The jacket (6) has, on an outer side (15), an axial stop (14), axially in contact with an axial counterstop (18) in the pushing-in direction (9) and is formed on the housing (2) on an inner side (17). A locking element (19) is axially supported on a support contour (20), is formed on the jacket (6) in the pushing-in direction (9), and is provided on the inner side (17) of the housing.

17 Claims, 3 Drawing Sheets

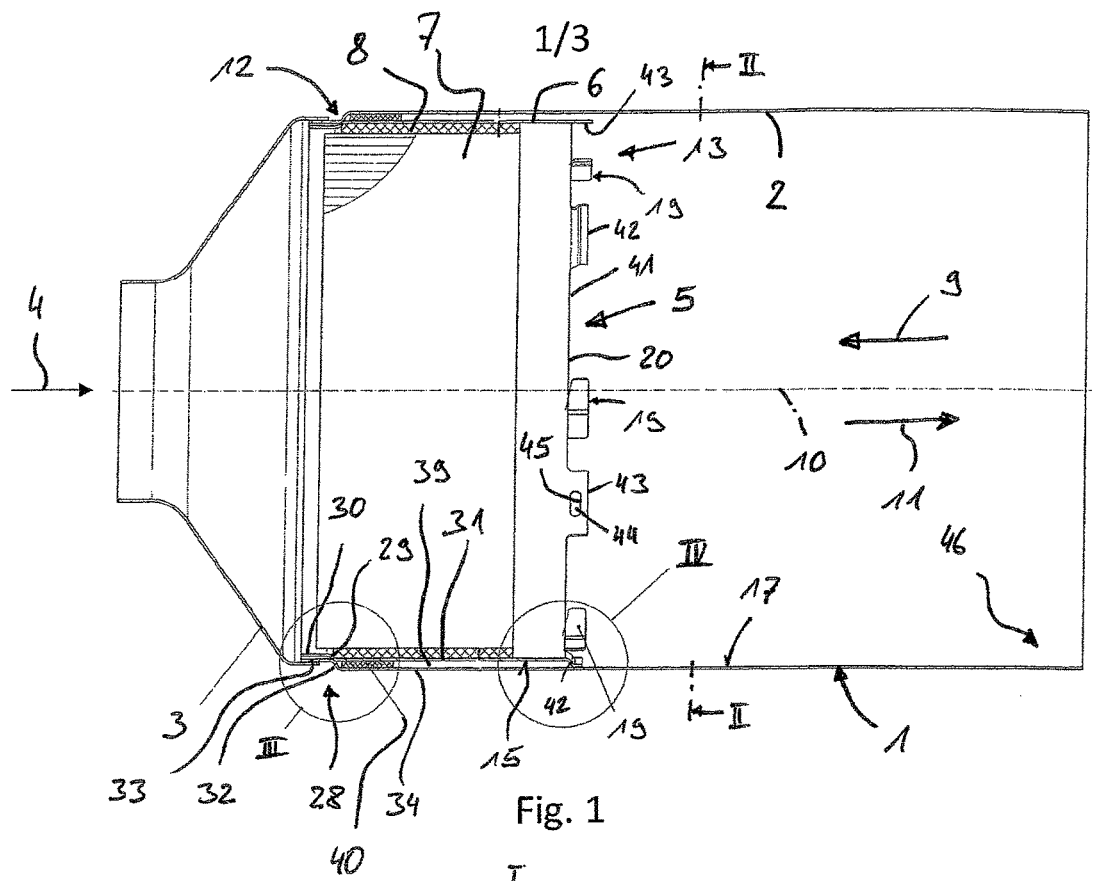
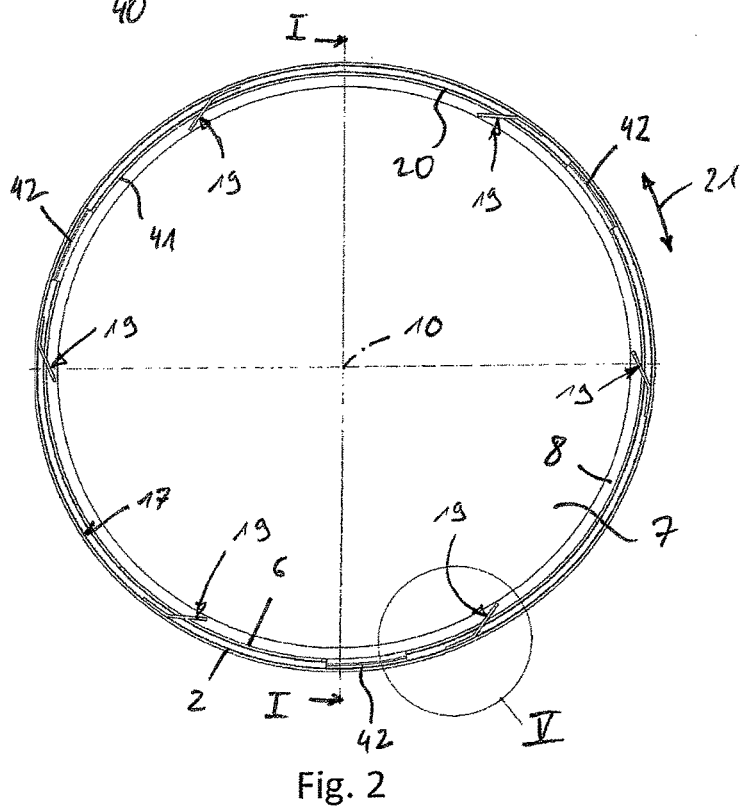
Fig. 1
Fig. 2

EXHAUST GAS TREATMENT DEVICE WITH REPLACEABLE INSERT

CROSS REFERENCE TO RELATED APPLICATIONS

This application claims the benefit of priority under 35 U.S.C. § 119 of German Patent Application 10 2015 209 681.5 filed May 27, 2015, the entire contents of which are incorporated herein by reference.

FIELD OF THE INVENTION

The present invention pertains to an exhaust gas treatment device for an exhaust system of an internal combustion engine, in the housing of which an insert with at least one exhaust gas treatment element is arranged. The present invention pertains, in addition, to an insert intended for installation in such an exhaust gas treatment device.

BACKGROUND OF THE INVENTION

An exhaust gas treatment device, such as a catalytic converter or a particle filter, usually has a tubular housing for ducting exhaust gas, in which at least one exhaust gas treatment element is arranged, which may be, depending the constellation of the exhaust gas treatment device, e.g., a catalytic converter element or a particle filter element. It is clear that a plurality of identical and/or different exhaust gas treatment elements may also be arranged in such an exhaust gas treatment device. Conceivable is, for example, the arrangement of an oxidation-type catalytic converter element upstream of a particle filter element or the arrangement of an oxidation-type catalytic converter element upstream of an SCR catalytic converter element, where SCR denotes selective catalytic reduction. It is likewise conceivable to arrange a particle filter element upstream of an SCR catalytic converter element.

Such exhaust gas treatment elements are subject to a certain wear during the operation, so that it may be necessary during the service life of the exhaust system equipped with them to remove, clean and reinstall the exhaust gas treatment element or to replace it with a new one. To ensure that this maintenance can be carried out in a simpler manner, provisions may be made for the respective exhaust gas treatment element to be arranged in an insert, which is itself arranged replaceably in the housing of the exhaust gas treatment device. For example, the complex mounting of ceramic substrates, which may be used in catalytic converters and particle filters, may be carried out in said insert, which can then be arranged replaceably in the housing in a suitable manner.

SUMMARY OF THE INVENTION

This is where the present invention comes into play. The present invention pertains to an object of providing, for such an exhaust gas treatment device or for such an insert, an improved embodiment, which makes it possible to mount the insert in the housing of the exhaust gas treatment device in a simplified manner, which simplifies the replacement of the insert and the removal and mounting of the insert during maintenance.

The present invention is based on the general idea of providing an axial stop, on the one hand, and an axial locking, on the other hand, for fixing the insert in the housing of the exhaust gas treatment device. The axial stop acts between a tubular jacket of the insert and the tubular housing and limits the extent to which the insert can be pushed into the housing in a pushing-in direction. The axial position of the insert in the housing is defined hereby by the axial stop. The locking fixes this axial position by preventing the insert from moving against the pushing-in direction relative to the housing. A predetermined relative position is ensured in this way between the insert and the housing, which simplifies the proper mounting or the proper installation of the insert in the housing.

The axial stop is preferably embodied by means of an axial stop and an axial counterstop complementary thereto, said stop being formed on an outer side of the jacket, while the counterstop is formed on an inner side of the housing. As soon as the stop comes axially into contact with the counterstop while the insert is being pushed into the housing, the predetermined relative position between the insert and the housing is reached. The locking is advantageously embodied by means of at least one locking element and a support contour, said respective locking element being provided on the inner side of the housing, while the support contour is formed on the jacket. The respective locking element is supported in the locked state axially at the support contour in the pushing-in direction. The insert is subsequently prevented from changing its axial position in an extraction direction opposite the pushing-in direction.

In order for the respective insert to be able to be arranged replaceably in the housing, the insert must be specifically coordinated with the respective exhaust gas treatment device, this coordination going beyond a purely geometric coordination, because, in particular, an axial stop, which cooperates with the housing-side counterstop when the predetermined relative position is reached between the insert and the housing, must be provided especially on the jacket outer side of the insert. Furthermore, the support contour on the jacket of the insert must be shaped and arranged such that it can interact with the respective housing-side locking element for the axial fixation of the insert in the housing, doing so when the insert-side stop is axially in contact with the housing-side counterstop.

The respective locking element is advantageously a separate component in relation to the housing, which component is fixed on the housing or on the inner side of the housing in a suitable manner. For example, the respective locking element may be welded or soldered to the housing. The locking element may be designed as a spring tongue in this case, which has a holding section permanently connected to the housing and a spring or locking section, which is radially elastically adjustable in relation thereto and at which, for example, a locking side, to be described below, can be formed.

The respective locking element comes into contact with the inner side of the housing in case of this separate mode of construction, so that the jacket of the insert must be coordinated in terms of its dimensioning with the inner side of the housing such that an annular gap will be formed between the inner side of the housing and the outer side of the jacket. This annular gap is dimensioned such that the locking element can be arranged in it in order to make it possible to move the insert past the respective locking element for removal and for mounting.

A plurality of such locking elements are advantageously arranged distributed, preferably regularly, in the circumferential direction.

The respective locking element may extend in the circumferential direction, so that the aforementioned locking section projects from the holding section in the circumferential direction.

According to an advantageous embodiment, the respective locking element may be configured as a radially elastic locking element, specifically such that it is extensively adjustable elastically between a locked position and an unlocked position. The respective locking element interacts with the support contour in the locked position to fix the insert axially in the housing. By contrast, the respective locking element releases the support contour in the unlocked position, so that the insert can be extracted from the housing in an extraction direction directed opposite the pushing-in direction. It is clear that this insert or another insert can also be pushed into the housing in the pushing-in direction in an unlocked position of the respective locking element. Such an elastic locking element can be embodied at an especially low cost and is characterized by high reliability.

According to another advantageous embodiment, the respective locking element may be supported prestressed at the counterstop, so that the stop is in contact with the counterstop in an axially prestressed state. Any axial clearance and preferably also any radial clearance can be eliminated between the insert and the housing due to the prestress between the locking element and the support contour. On the one hand, noise-generating relative motions between the insert and the housing can be avoided hereby. On the other hand, manufacturing tolerances can also be compensated hereby.

According to another advantageous embodiment, the respective locking element may have a ramp-like design on a locking side interacting with the support contour. The locking side is sloped, for example, at an angle greater than 0° and smaller than 45°, due to this ramp contour in relation to a cross-sectional plane, which extends at right angles to the central longitudinal axis of the housing. At the same time, radial centering of the insert in the housing is achieved due to the ramp shape of the locking side of the respective locking element, preferably when a plurality of such locking elements are arranged distributed in the circumferential direction.

According to an advantageous variant, the respective locking element may be arranged radially elastically in relation to the inner side of the housing and in contact, radially prestressed, with the support contour. The ramp-like locking side now generates an axial prestress in the jacket, which presses the jacket with its stop against the counterstop. The ramp-like locking side thus brings about a deflection of the radial prestressing force of the respective locking element into an axial prestress of the jacket.

In another advantageous embodiment, the stop may be arranged at an axial end section of the jacket, which end section protrudes in the pushing-in direction. The stop can be embodied hereby in an especially simple manner.

The stop may advantageously be formed by a jacket step extending in an annular pattern in the circumferential direction, which said jacket step connects an element-mounting section containing the respective exhaust gas treatment element with a jacket collar, whose outer cross section is smaller than the outer cross section of the element-mounting section. In other words, the jacket step generates the jacket collar, which is contracted compared to the element-mounting section. Such a jacket step can be manufactured in an especially cost-effective manner. At the same time, the stop is arranged hereby along the entire circumference and makes possible, as a result, a uniform support in the circumferential direction between the insert and the housing.

In another embodiment, which can preferably be embodied together with the above-mentioned embodiment, the counterstop may be formed by a housing step, which extends in an annular pattern in the circumferential direction and which connects an insert-mounting section containing the insert with a housing collar, whose inner cross section is smaller than the inner cross section of the insert-mounting section. In other words, the housing step generates a housing collar that is contracted compared to the insert-mounting section. This housing step can be embodied in a comparatively simple manner in this case as well. In addition, this housing step extends in the circumferential direction, so that a uniform support can be achieved in the circumferential direction between the housing and the insert. For example, an inlet funnel of the housing can be placed on the housing collar on the outside and permanently connected thereto, for example, by a welded connection or a soldered connection.

Especially advantageous is a variant in which both the aforementioned jacket step and the aforementioned housing step are embodied. The jacket step will thus axially be in contact with the housing step in the installed state. The jacket step and the housing step are coordinated with one another such that a quasi punctiform contact is obtained in the profile, which extends at right angles to the circumferential direction, between the outer side of the jacket and the inner side of the housing, but this contact extends in a linearly closed manner in the circumferential direction.

In particular, the jacket step and the housing step can be coordinated with one another such that the inner cross section of the housing collar is larger than the outer cross section of the jacket collar and smaller than the outer cross section of the element-mounting section. The inner cross section of the insert-mounting section is larger than the outer cross section of the element-mounting section. It is achieved in this way that a radial annular space each is formed both between the outer cross section of the jacket collar and the inner cross section of the housing collar, on the one hand, and between the outer section of the element-mounting section and the inner cross section of the insert-mounting section, on the other hand, and the contact between the jacket step and the housing step takes place in a conical area of the jacket step and the housing step. At the same time, radial centering of the insert in the housing is achieved hereby in the area of the stop. The interaction between the jacket step and the housing step is similar to the interaction between a valve disk and a valve seat, the valve disk being formed by the jacket step, while the valve seat is formed by the housing step. The axial stop being presented here correspondingly brings about a certain sealing between the jacket and the housing, as a result of which the risk of a leakage flow bypassing the insert is reduced.

An annular gap, in which at least one gap seal, which represents a separate component in relation to the jacket and especially also in relation to the housing, is arranged, may be formed radially between the inner side of the housing and the outer side of the jacket in another advantageous embodiment. The risk of a leakage flow, which bypasses the insert within the housing, can be reduced by means of such a gap seal. The gap seal is arranged loosely on the outer side of the jacket. It is preferably also arranged loosely on the inner side of the housing.

According to another embodiment, the support contour may be formed by an axial end face of the jacket, which faces away from the stop against the pushing-in direction, i.e., in the extraction direction. If a leading end of the insert defines a front end of the insert during the pushing in of the insert, the support contour is arranged at a rear end of the insert. The embodiment of the insert is simplified by the use of the axial end face of the jacket. In particular, in case of an optionally regular cylindrical housing and an optically regular cylindrical jacket, the exact rotation position between the insert and the housing is not important for achieving a proper interaction between the respective locking element and the support contour.

In another embodiment, at least one support bracket, which radially supports the jacket on the inner side of the housing, may be provided on the jacket in another embodiment. Radial positioning between the insert and the housing is simplified by such a support bracket. A plurality of such support brackets are advantageously arranged distributed in the circumferential direction in order to bring about a radial centering of the insert in the housing. The support brackets are advantageously formed on the axial end face of the jacket, preferably formed integrally in one piece therewith.

At least one extraction contour, with which an extraction tool can mesh in a positive-locking manner in order to extract the insert from the housing, may be provided on the jacket in another embodiment. Such an extraction contour may be formed, for example, by an undercut edge formed on the jacket, behind which edge the extraction tool can extend in a positive-locking manner. Especially simple is the embodiment in which such an extraction contour is formed by a radial opening in the jacket, into which opening the extraction tool can be inserted from the radially outer or radially inner direction, so that a positive-locking meshing with an edge of this opening is possible. Such an extraction contour may especially advantageously be formed at an extraction bracket, which is arranged on the jacket. For example, such an extraction bracket may be formed on the axial end face of the jacket, on which face the support contour is provided as well. A plurality of such extraction contours and a plurality of such extraction brackets, which are arranged distributed in the circumferential direction, are preferably provided. The respective extraction bracket advantageously contains a radial opening, whose opening edge forms the extraction contour.

In another advantageous embodiment, the housing can be opened and closed again against the pushing-in direction in an area located at a spaced location from the respective locking element, so that when the housing is opened, the respective insert can be extracted from the housing and can be pushed into same. For example, the housing may have, on its outlet side, an outlet funnel, which can be fastened to the rest of the housing with suitable quick-fastening means and removed therefrom in a simple manner. It is likewise conceivable to divide the housing in the axial direction and to fix the two housing parts detachably to one another, so that the inner sides of the two housing parts are accessible with the housing opened. At least one such insert each can then be arranged, in principle, in each of these housing parts, namely, in the above-described manner with axial stop and locking. It is likewise conceivable to arrange a plurality of such inserts with separate axial stops and separate locking devices axially one after another in the housing.

An insert according to the present invention, which is provided and intended for installation on an exhaust gas treatment device of the type described above, is characterized by a tubular jacket, in which at least one exhaust gas treatment element is fixed. The jacket is dimensioned such that the entire insert can be pushed axially into the housing in a pushing-in direction. Furthermore, the jacket has an axial stop, which is axially in contact with the counterstop of the housing in the installed state, as well as a support contour, at which the respective locking element is axially supported in the installed state. To ensure that the respective locking element can become axially supported at the support contour exactly when the stop of the jacket is in contact with the counterstop of the housing, the insert and the exhaust gas treatment device must be exactly coordinated with one another. In particular, the arrangement and the design of the stop and of the support contour on the side of the insert must be exactly coordinated with the arrangement and the design of the stop and of the counterstop and of the respective locking element for the insert to be also able to be used with the exhaust gas treatment device in the intended manner.

The respective exhaust gas treatment element may be fixed axially in the jacket, for example, by means of a mounting mat, for which the mounting mat is pressed radially between the exhaust gas treatment element and the jacket.

It is apparent that the above-mentioned features, which will also be explained below, may be used not only in the particular combination described, but in other combinations or alone as well, without going beyond the scope of the present invention. Preferred exemplary embodiments of the present invention are shown in the drawings and will be explained in more detail in the following description, identical reference numbers being used for identical or similar or functionally identical components. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a simplified longitudinal sectional view of an exhaust gas treatment device corresponding to section lines I in FIG. 2;

FIG. 2 is a cross sectional view of the exhaust gas treatment device according to section lines II in FIG. 1;

DESCRIPTION OF THE PREFERRED EMBODIMENTS

Figure 3:
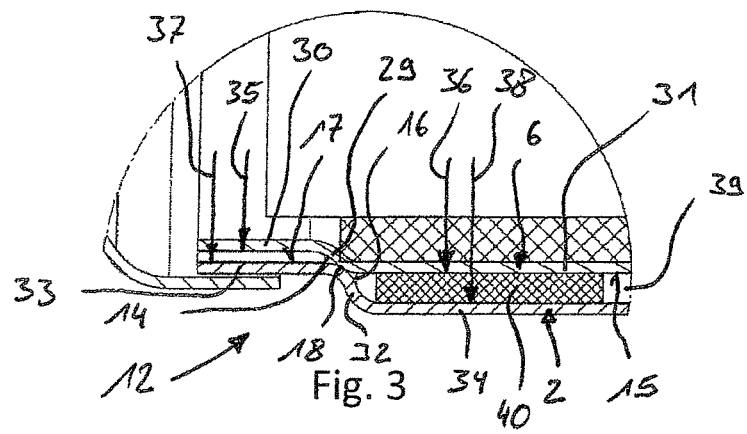
FIG. 3 is an enlarged detail III from FIG. 1.

Corresponding to FIG. 1, an exhaust gas treatment device 1 comprises a tubular housing 2, which is provided, in addition, with an inlet funnel 3 in the example. An exhaust gas flow direction intended during the operation is indicated in FIG. 1 by an arrow and is designated by 4. An outlet end of the housing 2 is not shown here. The exhaust gas treatment device 1 may be, for example, a particle filter or a catalytic converter or any desired combination of a plurality of different catalytic converters or of at least one catalytic converter and one particle filter. The exhaust gas treatment device 1 is intended for use in an exhaust system of an internal combustion engine, which is arranged, for example, in a motor vehicle.

At least one insert 5 is arranged replaceably in the housing 2. The insert 5 has a tubular jacket 6 as well as at least one exhaust gas treatment element 7, which is fixed in the jacket 6. For example, the exhaust gas treatment element 7 may be fixed in the jacket 6 by means of a mounting mat 8. The mounting mat 8 is pressed for this radially between the exhaust gas treatment element 7 and the jacket 6, as a result of which an axial fixation of the exhaust gas treatment element 7 relative to the jacket 6 is brought about. The jacket 6 may also be called canning with the exhaust gas treatment element 7 fixed therein.

The insert 5 is coordinated with the housing 2 such that it can be pushed into the housing 2 in a pushing-in direction 9 indicated by an arrow. The pushing-in direction 9 extends parallel to a central longitudinal axis 10 of the housing 2. Furthermore, the insert 5 can be extracted from the housing 2 in an extraction direction 11, which is likewise indicated by an arrow. The extraction direction 11 likewise extends parallel to the central longitudinal axis 10.

The insert 5 is fixed in the housing 2 axially by means of an axial stop 12, on the one hand, and by means of a locking device 13, on the other hand. In addition, the axial stop 12 and the locking device 13 bring about a radial centering of the insert 5 in the housing 2 in the preferred embodiment being shown here.

According to FIG. 3, the axial stop 12 has an axial stop 14, which is formed on an outer side 15 of the jacket 6. The axial stop 12 has, in addition, an axial counterstop 16, which is formed on the inner side 17 of the housing 2. The stop 14 is axially in contact with the counterstop 16, specifically in the pushing-in direction 9, in the pushed-in or installed state. A corresponding contact point is designated by 18 in FIG. 3.

According to FIGS. 1, 2, 4 and 5, the locking device 13 comprises at least one locking element 19, which is axially supported at a jacket-side support contour 20 in the pushing-in direction. The support contour 20 is formed on the jacket 6. A plurality of such locking elements 19, which are arranged distributed uniformly in the circumferential direction 21 of the housing 2, are advantageously provided. The circumferential direction 21 is related to the central longitudinal axis 10. Exactly six such locking elements 19 are provided in the example shown in FIG. 2. However, there also may be more or fewer than six locking elements 19.

Figure 5:
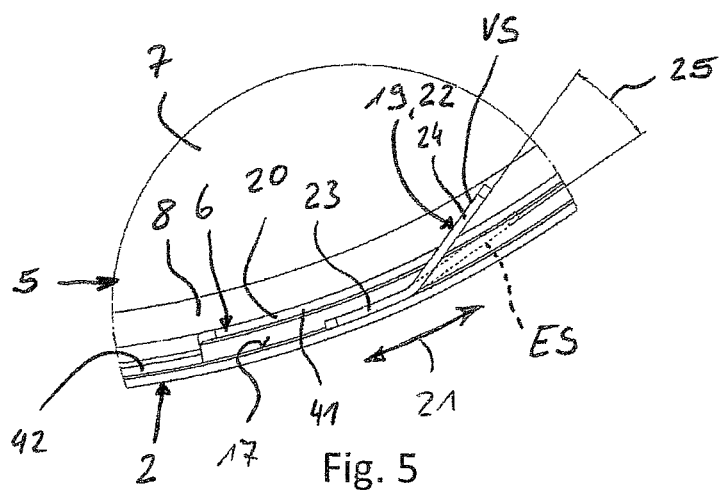
FIG. 5 is an enlarged detail V from FIG. 2.

The respective locking element 19 is configured according to FIG. 5 as a radially elastic locking element so that it is extensively adjustable elastically between a locked position VS represented by a solid line in FIG. 5 and an unlocked position ES indicated by an interrupted line. In the locked position VS, the respective locking element 19 interacts with the support contour 20 for the axial fixation of the insert 5 in the housing 2. By contrast, the respective locking element 19 releases the support contour 20 in the unlocked position ES, so that the insert 5 can subsequently be extracted from the housing 2 in the extraction direction 11.

In the example shown, the respective locking element 19 is formed by a spring bracket 22, which has a holding section 23 and a locking section 24 and represents a separate component in relation to the housing 2. The spring bracket 22 is fixed to the inner side 17 of the housing with the holding section 23, for example, by means of a soldered connection or by means of a welded connection. The holding section 23 may, in principle, also be riveted to the housing 2. The locking section 24 is radially elastically movable in relation to the holding section 23 in order to make possible the above-mentioned two positions, namely, the locked position VS and the unlocked position ES, for the locking element 19.

The locking element 19 is arranged, in general, at the housing 2 such that it is elastically adjustable between the locked position VS and the unlocked position ES in relation to a bending axis extending in parallel to the central longitudinal axis 10. The respective locking element 19 extends for this in the circumferential direction 21. This means for the spring bracket 22 that the locking section 22 projects from the holding section 23 in the circumferential direction 21 and forms an angle with the circumferential direction 21 and with the tangent drawn to the housing 2 at least in the locked position VS. Such an angle is also present in the example shown in FIG. 5 in the unlocked position ES between the locking section 24 and the circumferential direction 21 or a tangent drawn to the housing 2. A differential angle 25, which is generated by the locking section 24 in the locked position VS relative to the unlocked position ES, is correspondingly also present between the locking section 24 and the circumferential direction 21 or a tangent drawn to the housing 2 in the unlocked position ES in the example shown in FIG. 5.

Especially advantageous is here an embodiment in which the respective locking element 19 is supported at the support contour 20 in a prestressed state, so that the stop 14 is ultimately in contact with the counterstop 16 in an axially prestressed state via the jacket 6. This is accomplished in the example being shown by means of a ramp-like locking side 26, via which the respective locking element 19 is supported according to FIG. 4 at the support contour 20. The ramp-like locking side 26 is sloped in relation to a cross-sectional plane 27, which extends at right angles to the central longitudinal axis 10 and in which the support contour 20 is located in the example shown in FIG. 4. For example, the slope angle between the locking side 26 and the cross-sectional plane 27 is smaller than 45°.

Due to the locking element 19 being oriented in the circumferential direction 21, the ramp-like locking side 26 produces a radial, inwardly oriented prestress, on the one hand, at the support contour 20 in conjunction with the radial elasticity. This radial prestress brings about, on the one hand, a centering of the insert 5 in the housing 2. On the other hand, this radial prestress is converted via the ramp-like locking side 26 into an axial prestress of the jacket 6 in the pushing-in direction 9, so that the jacket 6 is ultimately supported at the counterstop 16 of the housing 2 via the stop 14 in an axially prestressed state.

As can be seen especially in FIG. 1, the jacket-side stop 14 is arranged at an axial end section 28 of the jacket 6 protruding in the pushing-in direction 9. As a result, the stop 14 can be embodied in an especially simple manner by a jacket step 29 extending in an annular pattern in the circumferential direction 21. This jacket step 29 connects a jacket collar 30 with an element-mounting section 31, which contains the at least one exhaust gas treatment element 7. Analogously hereto, the housing-side counterstop 18 is formed in the example by a housing step 32, which extends in an annular pattern in the circumferential direction 21 and connects a housing collar 33 with an insert-mounting section 34, in which the insert 5 is arranged. According to FIG. 3, an outer cross section 35 of the jacket collar 30 is smaller than an outer cross section 36 of the element-mounting section 31. Furthermore, an inner cross section 37 of the housing collar 33 is smaller than an inner cross section 38 of the insert-mounting section 34. Furthermore, provisions are made for the jacket step 29 and the housing step 32 to be coordinated with one another such that the jacket 6 is supported at the housing step 32 via the jacket step 29 and the punctiform contact 18, which extends in a linearly closed pattern in the circumferential direction 21, advantageously becomes established in the profile, i.e., at right angles to the circumferential direction 21. The housing step 32 represents a kind of seating for the jacket step 29, as a result of which a contact that is closed in the circumferential direction 21 will become established between the jacket 6 and the housing 2. The inner cross section 37 of the housing collar 33 is larger than the outer cross section 35 of the jacket collar 30 and smaller than the outer cross section 36 of the element-mounting section 31. Furthermore, the inner cross section 38 of the insert-mounting section 34 is larger than the outer cross section 36 of the element-mounting section 31.

The inlet funnel 3 of the housing 2 is placed here on the housing collar 33 on the outside and is permanently connected to it, for example, by a welded connection or by a soldered connection.

As can be seen in FIGS. 1 and 3, an annular gap 39, in which at least one gap seal 40 is arranged, is formed radially between the inner side 17 of the housing and the outer side 15 of the jacket. The gap seal 40 is configured, for example, as a soft material seal unaffected by changes of temperature, for example, a seal made of or with graphite. It has an annular configuration in the circumferential direction 21. The gap seal 40 is a separate component in relation to the jacket 6 and is arranged thereon only loosely, i.e., it is fixed to it.

Figure 4:
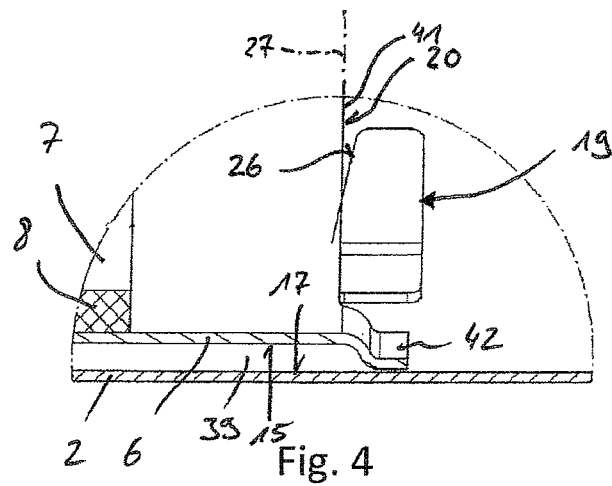
FIG. 4 is an enlarged detail IV from FIG. 1.

According to FIGS. 1, 2 and 4 as well as 5, the support contour 20 is formed on an axial end face 41 of the jacket 6, which end face faces away from the stop 14 in the extraction direction 11. The support contour 20 can be embodied as a result in an especially simple manner. A plurality of support brackets 42 are formed on the end face 41 of the jacket 6 in the example being shown and they are preferably formed integrally on the jacket 6. Three such support brackets 42, which are arranged uniformly distributed in the circumferential direction 21, are shown in FIG. 2 as an example. The support brackets 42 axially project from the end face 41 and are, in addition, supported radially on the inner side 17 of the housing. As a result, the support brackets 42 likewise bring about a centering of the jacket 6 in the housing 2.

In addition, a plurality of extraction brackets 43, which contain a radial opening 44 each, are formed on the jacket 6 in the example being shown, and an opening edge defines an extraction contour 45, at which an extraction tool, not being shown here, can mesh in a positive-locking manner in order to extract the insert 5 from the housing 2. According to FIG. 3, three such extraction brackets 43, which are arranged uniformly distributed in the circumferential direction 21, are provided in the example. The extraction brackets 43 are also arranged on the end face 41 of the jacket 6 in the example, so that they axially project therefrom.

According to FIG. 1, the housing 2 is formed in an area 46 such that it can be opened and closed again. This area 46 is located at an axially spaced location from the respective locking element 19 in the extraction direction 11. With the housing 2 opened, the respective insert 5 can be extracted from the housing 2 and can be pushed into same. The locking elements 19 are to be moved for this from their locked position VS into their unlocked position ES, for example, by means of a corresponding tool. The area 46 is opened in FIG. 1. A closure of the housing 2 is not shown here and may be formed, for example, by an outlet funnel, which may be detachably fastened to the housing 2 by means of corresponding fastening means. Such fastening means are, for example, a pipe clamp.

Figure 6:
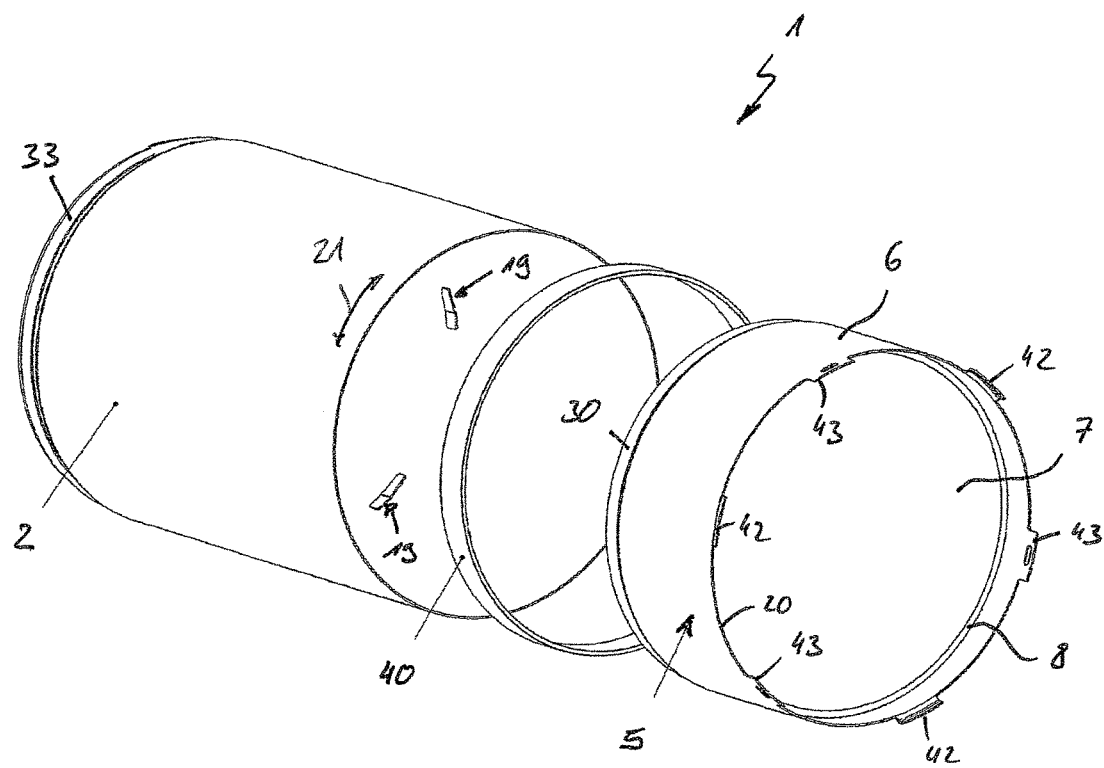
FIG. 6 is an isometric disassembled view of the exhaust gas treatment device during removal or during mounting.

After opening the housing 2 and after moving the locking elements 19 into the unlocked position ES thereof, the insert 5 can be extracted from the housing 2 by means of an extraction tool in the extraction direction 11. The gap seal 40 can then likewise be removed. According to FIG. 6, a new gap seal 40 can then be inserted first. A reconditioned insert 5 or a new insert 5 can then be pushed in, while the locking elements 19 are advantageously maintained in the unlocked position ES by means of a corresponding tool in this case as well. As soon as the insert 5 reaches its predetermined position in the housing 2, its stop 14 comes into contact with the counterstop 18 of the housing 2. By removing the aforementioned tool, the locking elements 19 can be moved from the unlocked position ES into the locked position VS. The locking elements 190 now spring radially inward, while driving the support contour 20 axially in the pushing-in direction 9 via the ramp-like locking contour 26. At the same time, centering of the insert 5 in the housing 2 and an axial prestress between the stop 14 and the counterstop 18 are achieved hereby. The housing 2 can subsequently be closed again.

The radial direction mentioned in this connection is related to the central longitudinal axis 10 of the housing 2.

Even though the cross section of the housing 2 and the cross section of the jacket 6 are shown as regular cylindrical cross sections in FIG. 2, any other desired, preferably round cross sections, for example, elliptical and oval cross sections, may, in principle, be provided for the housing 2 and the jacket 6. Nonround, angular cross sections are theoretically also conceivable.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine, the exhaust gas treatment device comprising:
    a tubular housing;
    an insert arranged in the tubular housing, the insert comprising a tubular jacket and at least one exhaust gas treatment element fixed in the tubular jacket, wherein the insert can be pushed into the housing in a pushing-in direction, which pushing-in direction extends parallel to a central longitudinal axis of the housing;
    an axial stop on an outer side of the tubular jacket;
    an axial counterstop formed on an inner side of the housing, the axial stop being axially in contact with the axial counterstop in the pushing-in direction;
    at least one locking element axially supported on a support contour formed on the tubular jacket in the pushing-in direction, the at least one locking element being provided on the inner side of the housing, the at least one locking element fixing the insert in an axial direction with respect to the central longitudinal axis of the housing; and
    another locking element to provide a plurality of locking elements, wherein each of the locking elements has a ramp on a locking side interacting with the support contour, each of the locking elements being located at a circumferentially spaced location from another one of the locking elements with respect to the central longitudinal axis,
    wherein the locking elements are arranged radially elastically in relation to the inner side of the housing and is in contact with the support contour in a radially prestressed state, so that the ramp locking side introduces an axial prestress into the jacket.

2. A device in accordance with claim 1, wherein the locking element is configured as a radially elastic locking element that is elastically adjustable between a locked position, in which the locking element interacts with the support contour for axial fixation of the insert in the housing, and an unlocked position, in which the locking element releases the support contour, so that the insert can be extracted from the housing in an extraction direction that is opposite to the pushing-in direction, the jacket comprising a fluid intake end and a fluid discharge end, the locking element being located adjacent to the fluid discharge end, the counterstop being located adjacent to the fluid intake end.

3. A device in accordance with claim 1, wherein the locking element is supported in a prestressed state at the support contour, so that the stop is in contact with the counterstop in an axially prestressed state.

4. A device in accordance with claim 1, wherein the stop is arranged at an axial end section of the jacket, which end section is a leading end section in the pushing-in direction.

5. A device in accordance with claim 1, wherein the jacket comprises an outer jacket surface, the outer jacket surface defining the stop, the stop comprising a jacket step, which extends in an annular pattern in a circumferential direction and connects an element-mounting section containing the at least one exhaust gas treatment element with a jacket collar, the jacket collar having an outer cross section that is smaller than an outer cross section of the element-mounting section, the outer jacket surface extending continuously, without interruption, from one end of the jacket to another end of the jacket.

6. A device in accordance with claim 1, wherein the housing comprises an inner housing surface, the inner housing surface defining the counterstop, the counterstop comprising a housing step, which extends in an annular pattern in the circumferential direction and which connects an insert-mounting section containing the insert with a housing collar, the housing collar having an inner cross section that is smaller than an inner cross section of the insert-mounting section, the inner housing surface extending continuously, without interruption, from one end of the housing to another end of the housing.

7. A device in accordance with claim 1, wherein:
the jacket comprises an outer jacket surface, the outer jacket surface defining the stop, the stop comprising a jacket step, which extends in an annular pattern in a circumferential direction and connects an element-mounting section containing the at least one exhaust gas treatment element with a jacket collar, the jacket collar having an outer cross section that is smaller than an outer cross section of the element-mounting section, the outer jacket surface extending continuously, without interruption, from one end of the jacket to another end of the jacket;
the housing comprises an inner housing surface, the inner housing surface defining the counterstop, the counterstop comprising a housing step, which extends in an annular pattern in the circumferential direction and which connects an insert-mounting section containing the insert with a housing collar, the housing collar having an inner cross section that is smaller than an inner cross section of the insert-mounting section, the inner housing surface extending from one end of the housing to another end of the housing;

the inner cross section of the housing collar is larger than the outer cross section of the jacket collar and smaller than the outer cross section of the element-mounting section; and
the inner cross section of the insert-mounting section is larger than the outer cross section of the element-mounting section.

8. A device in accordance with claim 1, further comprising at least one a gap seal, wherein an annular gap, in which the at least one gap seal is arranged, is formed radially between the inner side of the housing and the outer side of the jacket.

9. A device in accordance with claim 1, wherein the support contour is formed on an axial end face of the jacket, the end face facing away from the stop opposite the pushing-in direction.

10. A device in accordance with claim 1, wherein at least one support bracket, which radially supports the jacket on the inner side of the housing, is provided on the jacket.

11. A device in accordance with claim 1, wherein the insert has at least one extraction contour, with which an extraction tool configured to connect in a positive-locking manner in order to extract the insert from the housing.

12. A device in accordance with claim 1, wherein the housing is configured be opened and closed again in an area located at a spaced location from the respective locking element opposite the pushing-in direction, wherein with the housing opened, the insert is configured be extracted from the housing and configured to be pushed into the housing.

13. An insert device for installation in an exhaust gas treatment device comprising a tubular housing with a counterstop and an insert to be arranged in the tubular housing, the insert device comprising:
a jacket;
at least one exhaust gas treatment element fixed in the jacket, the jacket being adapted to be pushed axially into the tubular housing in a pushing-in direction;
an axial stop axially in contact with the counterstop of the housing in an installed state of the jacket;
a support contour with a locking element axially supported in the installed state, the locking element fixing the insert in an axial direction with respect to a central longitudinal axis of the housing; and
another locking element to provide a plurality of locking elements,
wherein:
each of the locking elements has a ramp on a locking side interacting with the support contour;
each of the locking elements is located at a circumferentially spaced location from another one of the locking elements with respect to the central longitudinal axis; and
each of the locking elements arranged radially elastically in relation to the inner side of the housing and is in contact with the support contour in a radially prestressed state, so that the ramp locking side introduces an axial prestress into the jacket.

14. An insert device in accordance with claim 13, wherein the locking element is configured as a radially elastic locking element that is elastically adjustable between a locked position, in which the locking element interacts with the support contour for axial fixation of the insert in the housing, and an unlocked position, in which the locking element releases the support contour, so that the insert can be extracted from the housing in an extraction direction that is opposite to the pushing-in direction, the jacket comprising a fluid intake end and a fluid discharge end, the locking element being located adjacent to the fluid discharge end, the counterstop being located adjacent adjacent to the fluid intake end.

15. An insert device in accordance with claim 13, wherein the jacket comprises a jacket outer surface, the jacket outer surface defining the stop, wherein the stop is defined by a jacket step of the jacket outer surface, the jacket step extending in an annular pattern in a circumferential direction and the jacket step connecting an element-mounting section containing the at least one exhaust gas treatment element with a jacket collar, the jacket collar having an outer cross section that is smaller than an outer cross section of the element-mounting section, the jacket outer surface extending continuously, without interruption, from one end of the jacket to another end of the jacket.

16. An insert device in accordance with claim 13, wherein the housing comprises a housing inner surface, the housing inner surface comprising a counterstop, the counter stop being defined by a housing step of the housing inner surface, the housing step extending in an annular pattern in the circumferential direction and the housing step connecting an insert-mounting section containing the insert with a housing collar, the housing collar having an inner cross section that is smaller than an inner cross section of the insert-mounting section, the inner housing surface extending continuously, without interruption, from one end of the housing to another end of the housing.

17. An insert device in accordance with claim 13, wherein:
the jacket comprises a jacket outer surface, the jacket outer surface defining the stop, the stop comprising a jacket step of the jacket outer surface, the jacket outer surface extending in an annular pattern in a circumferential direction and connects an element-mounting section containing the at least one exhaust gas treatment element with a jacket collar, the jacket collar having an outer cross section that is smaller than an outer cross section of the element-mounting section, the jacket outer surface extending continuously, without interruption, from one end of the jacket to another end of the jacket;

the housing comprises a housing inner surface, the housing inner surface defining the counterstop, the counterstop comprising a housing step of the housing inner surface, the housing step extending in an annular pattern in the circumferential direction and the housing step connecting an insert-mounting section containing the insert with a housing collar, the housing collar having an inner cross section that is smaller than an inner cross section of the insert-mounting section, the inner housing surface extending continuously, without interruption, from one end of the housing to another end of the housing;

the inner cross section of the housing collar is larger than the outer cross section of the jacket collar and smaller than the outer cross section of the element-mounting section; and the inner cross section of the insert-mounting section is larger than the outer cross section of the element-mounting section.

\* \* \* \* \*